April 19, 1960     L. R. PHILLIPS     2,933,035
AIR OUTLET DEVICE FOR VENTILATING APPARATUS
Filed May 9, 1958     2 Sheets-Sheet 1
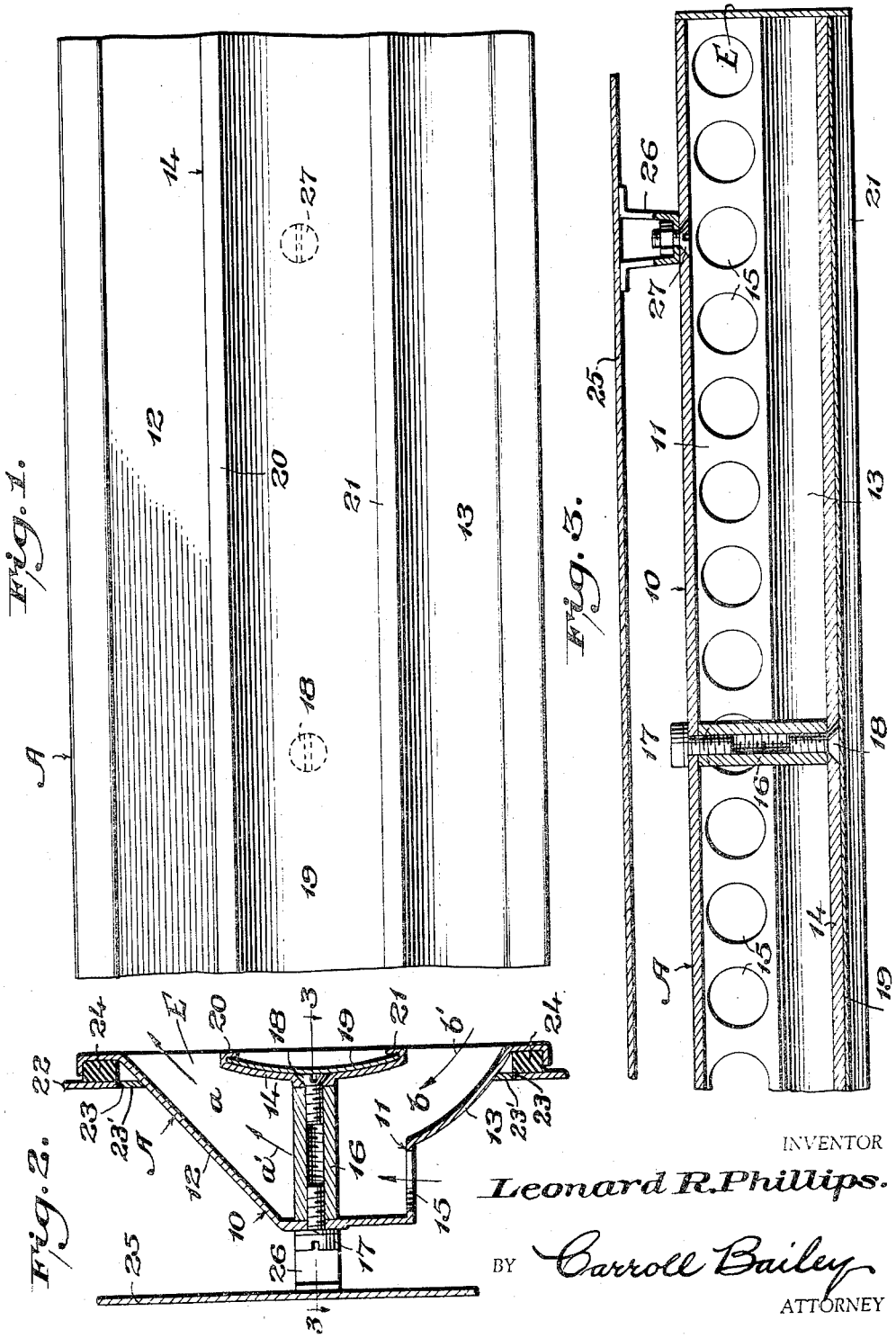
INVENTOR
*Leonard R. Phillips.*
BY *Carroll Bailey*
ATTORNEY April 19, 1960 L. R. PHILLIPS 2,933,035
AIR OUTLET DEVICE FOR VENTILATING APPARATUS
Filed May 9, 1958 2 Sheets-Sheet 2
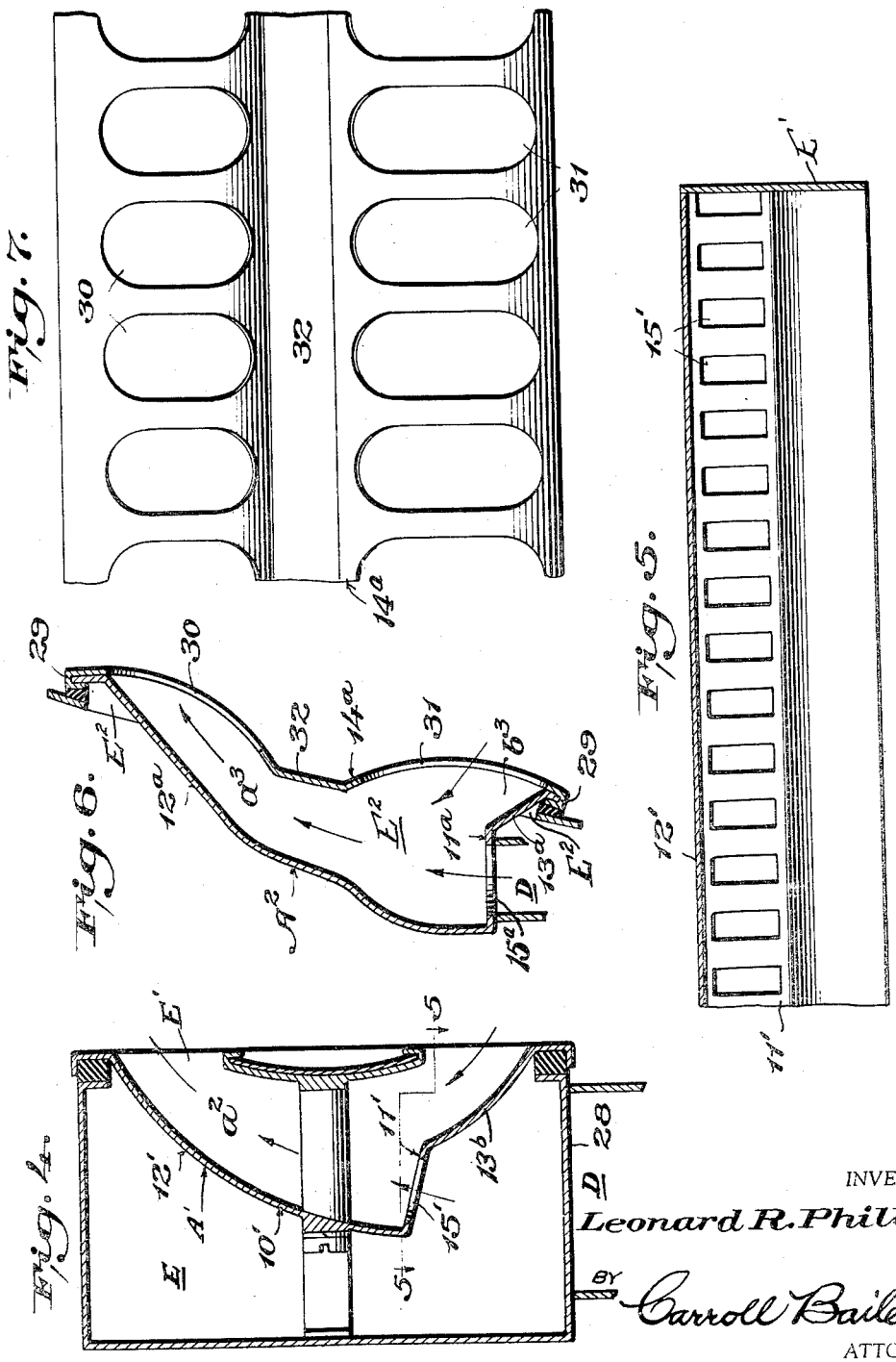
INVENTOR
Leonard R. Phillips.
BY Carroll Bailey
ATTORNEY United States Patent Office 2,933,035
Patented Apr. 19, 1960

2,933,035

AIR OUTLET DEVICE FOR VENTILATING APPARATUS

Leonard R. Phillips, West Hartford, Conn., assignor to Anemostat Corporation of America, New York, N.Y., a corporation of Delaware Application May 9, 1958, Serial No. 734,313

10 Claims. (Cl. 98—40)

This invention relates to air outlet devices through which supply air for heating, cooling or any other purpose is delivered into enclosures, and has particular reference to improvements in air outlet devices of the relatively narrow, elongated type for delivering air into elongated enclosures such as aircraft cabins, railway cars, motor buses, hallways and the like.

Generally speaking the object of the invention is to provide a narrow, elongated air outlet device which is of simple, inexpensive, practical construction and which embodies a design such that supply air flowing through the same into an enclosure induces into the device for admixture with the supply air a considerable proportionate amount of the enclosure air, whereby the temperature of the supply air is modulated and brought more nearly to the temperature of the enclosure air before it enters the enclosure.

With the foregoing and other objects in view, as will become more fully apparent as the nature of the invention is better understood, the same consists in an air outlet device embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a fragmentary front elevation of an air outlet device constructed in accordance with the invention.

Fig. 2 is a transverse section through the device shown in Fig. 1.

Fig. 3 is a horizontal section taken on the line 3—3 of Fig. 2.

Fig. 4 is a view similar to Fig. 2 illustrating a modified form of the device.

Fig. 5 is a horizontal section on the line 5—5 of Fig. 4.

Fig. 6 is a view similar to Fig. 2 illustrating another modified form of the device; and Fig. 7 is a fragmentary front elevation of the structure shown in Fig. 6.

Referring to the drawings in detail, first to the form of the invention illustrated in Figs. 1 to 3, it will be observed that the device comprises an elongated, open-front, hollow member, designated generally as A, which is composed of a wall 10 having in cross section, a transversely extending medial portion 11, an upper portion 12 which extends upwardly and forwardly from the rear edge of said medial portion 11, and a lower portion 13 which extends downwardly and forwardly from the front edge of said medial portion 11. It will further be observed that the device comprises a plate 14 which is co-extensive in length with the member A but is of less height or width than said member A and which is disposed in front of and spaced from the wall 10 to provide between the same and the upper portion 12 of said wall an upper passageway, designated as $a$, and between the same and the lower portion 13 of said wall a lower passageway designated as $b$.

In the medial portion 11 of the wall 10 are openings 15 of suitable size and shape which are disposed in spaced apart relationship to each other along the length of said medial portion and through which supply air for heating, cooling or other purposes is delivered in any suitable manner from any suitable source upwardly into the upper passageway $a$.

The upper passageway $a$ opens at its upper end through the front of the device. On the other hand, the lower passageway $b$ opens at its lower end through the front of the device and at its upper end communicates with the lower end of the upper passageway $a$. Therefore, supply air flowing upwardly through the upper passageway $a$ into the space in front of the device as indicated by the arrows $a'$ induces flow of air from said space through the lower passageway $b$ into said upper passageway as indicated by the arrow $b'$. The result is that the induced air becomes mixed with the supply air and modulates its temperature so that it is brought more nearly to the temperature of the air in the space in front of the device before it is delivered into said space. Obviously, depending upon the size, shape and spacing of the openings 15, any given volume of supply air delivered through the device may be caused to induce into the device a more or less proportionate volume of air from the space in front of the device for admixture with the supply air to modulate the latter to a greater or lesser extent. In this connection it will be understood, of course, that the device is designed to be mounted in or upon a wall of an elongated enclosure, such as an aircraft cabin, railway car, hallway or the like, and to extend any desired distance along the enclosure at any suitable location relative thereto so as to deliver air in a most advantageous manner into the enclosure for heating, or cooling the enclosure or for any other purpose.

Due to the spaced apart relationship of the openings 15, supply air enters the upper passageway in the form of separate, spaced apart streams or jets between which the induced air is entrained in the form of separate, spaced apart streams. Hence, effective mixing of the entrained air with the supply air is accomplished.

The upper portion 12 of the wall 10 and the plate 14 converge upwardly relative to each. The upper passageway $a$ therefore is of Venturi shape in cross section which causes still more thorough mixing of the induced air with the supply air and diffusion of the mixed air as it enters the enclosure in front of the device.

The plate 14 may be mounted in front of the member A in any suitable manner. In this connection and as illustrated by way of example in the drawings, posts 16 may be fastened by means of screws 17 to the upper portion of the wall 10 so as to extend forwardly from said wall portion, and the plate 14 may be fastened against the front ends of said posts by means of screws 18 which extend through said plate and are threaded into said posts.

In order to enhance the attractive appearance of the device it may be desirable to cover the heads of the screws 18 by a strip 19 of any suitable material disposed against the front of the plate 14, in which event said plate may be provided along its upper and lower edges with downwardly and upwardly extending lips 20 and 21, respectively, which may be spaced forwardly from said plate to provide grooves or channels in which the upper and the lower edges of the strip 19 may be engaged to hold said strip against the front of said plate.

In some instances, as in the case of an aircraft for example, a hollow wall may be available wherein the device may be mounted and which may be employed as a conduit for delivery of supply air to the device. In any such instance the inner skin 22 of the hollow wall may be slotted to form an opening into the enclosure, as indicated in Fig. 2 of the drawings by top and bottom edges 23 and side edges 23' of the opening to permit disposition of a major portion of the device within the wall for flow of supply air from the interior of the wall through the openings 15 into the device. To provide seals to prevent escape of air from the hollow wall through the slot 23, the upper and the lower wall portions 12 and 13 of the member A may overlap the inner skin 22 of the hollow wall adjacent to the top and the bottom respectively, of the slot 23 and sealing strips 24 may be interposed between said wall portions and said skin where they overlap. Similarly, suitable end walls E enclose both ends of the member A and extend forwardly to overlap and seal off the side edges 23' of the enclosure opening.

Any suitable means may be provided to mount the device in a hollow wall. In this connection and as illustrated by way of example in Figs. 2 and 3 of the drawings, the outer skin 25 of the hollow wall may have brackets 26 welded or otherwise suitably fastened thereto and screws 27 may extend through the wall 10 of the device into said brackets so as to draw the device into the hollow wall and compress the sealing strips 24 thus not only to firmly mount the device but to insure effective sealing of the slot 23.

Figs. 4 and 5 of the drawings illusttrate a form of the device which is generally the same as the Figs. 1 to 3 form with the exceptions that the upper portion 12' of the wall 10' of the hollow member A' is continuously curved upwardly and forwardly for smooth flow of air through the upper passageway $a^2$ of the device; that the medial portion 11' of the wall 10' is slightly inclined downwardly and forwardly to dispose the openings 15' therein at substantially right angles to the general direction of flow of air through the upper passageway $a^2$, and that the openings 15' are of rectangular shape rather than circular shape as shown in Figs. 2 and 3. The lower portion $13^b$ is disposed similar to the lower portion 13 of the Figs. 1–3 form. Fig. 4 additionally illustrates that the device may be mounted in an air supply duct 28 in the same manner as it may be mounted in a hollow wall. The supply air may be furnished to the outlet through a duct collar D which may be attached at any point or points along the length of supply duct 28. Suitable end walls E' seal off the ends of the supply duct 28 and hollow member A'.

Obviously, the Figs. 1 to 3 form of the invention may be modified in the light of the Figs. 4 and 5 form of the invention or the Figs. 4 and 5 form of the invention may be modified in the light of the Figs. 1 to 3 form of the invention.

Figs. 6 and 7 of the drawings illustrate a form of the invention in which the device is composed of only two elements; viz., a sheet metal member $A^2$ corresponding to the member A of the Figs. 1 to 3 form of the invention and a sheet metal plate $14^a$ corresponding to the plate 14 of the Figs. 1 to 3 form of the invention.

The member $A^2$ is, generally speaking, of the same cross sectional shape as the member A in that it includes a transversely extending medial portion $11^a$, an upper portion $12^a$ which extends upwardly and forwardly from the rear edge of said medial portion, and a lower portion $13^a$ which extends downwardly and forwardly from the front edge of said medial portion. On the other hand, the plate $14^a$ is of substantially the same height or width as the member $A^2$ and at its upper and lower edges is suitably joined to the upper and lower edge portions of said member $A^2$ as by crimpings designated as 29. End walls $E^2$ overlie the ends of device and extend to seal the side edges of the enclosure opening.

The plate $14^a$ is spaced forwardly from the member $A^2$ to provide between the same and said member upper and lower passageways $a^3$ and $b^3$, respectively, while in the medial portion $11^a$ of the member $A^2$ are openings $15^a$ for flow of supply air upwardly through the upper passageway $a^3$. In the upper portion of the plate $14^a$ are openings 30 for outlet of air from the upper end of the passageway $a^3$ into an enclosure, while in the lower portion of said plate $14^a$ are openings 31 for inlet of enclosure air into the lower passageway $b^3$. In addition, the upper portion of the plate $14^a$ is curved downwardly and inwardly to the top of a medial portion 32 of said plate, and the lower portion of said plate is curved upwardly and inwardly to the bottom of said medial portion 32 so that a portion of the upper passageway $a^3$ is of Venturi shape in cross section. The Figs. 6 and 7 form of the invention therefore operates in the same manner as the previously described forms of the invention.

Obviously, the Figs. 6 and 7 form of the invention may be mounted in a hollow wall in the same manner as the Figs. 1 to 3 form of the invention, or in a duct in the same manner as the Figs. 4 and 5 form of the invention. If mounted within a hollow wall, then the inner space between the walls would serve as the supply duct. An alternate installation would be to attach a duct collar D along the length of the medial portion $11a$ as shown in Fig. 6. Obviously, too, in any of the illustrated forms of the invention the lower wall portion of the member A or its equivalent may be eliminated if desired.

As will be understood, the device may be formed in sections of any desired length and any desired plurality of sections may be mounted in end to end relationship to each other to provide a device of any desired over-all length.

From the foregoing description considered in connection with the accompanying drawings it is believed that the construction and mode of operation of the device will be clearly understood and that its advantages will be appreciated. It is desired to point out, however, that while only certain specific structural embodiments of the invention have been illustrated and described, the same is readily capable of various other specifically different structural embodiments within its spirit and scope as defined in the appended claims.

I claim:

1. An air outlet device designed to be mounted within an opening in an enclosure and provided with a supply duct, comprising, an elongated, open-front, hollow member provided with end walls, said end walls extending forwardly to seal off the side edges of said opening, said hollow member composed of a unitary wall having in cross section, a transversely extending portion and an upper portion extending upwardly and forwardly from the rear edge of said transversely extending portion, and a lower portion extending downwardly and forwardly from the front edge of said transversely extending portion, said upper and lower portions provided at their outer ends with means for sealing off the top and bottom edges respectively of said opening, said transversely extending portion having therein, in spaced apart relationship to each other along its length, a plurality of spaced openings for flow of supply air upwardly therethrough into the upper portion of said member, and an elongated plate mounted in front of and spaced from said wall to provide between the same and the upper portion of said wall an upper passageway and between the same and the front edge of the said transversely extending portion of said wall a lower passageway, said passageways opening at their top and bottom, respectively, through the front of the device and said lower passageway communicating with the bottom of said upper passageway, whereby supply air flowing through the upper passageway into an enclosure in front of the device induces into said upper passageway through the lower passageway air from the enclosure for admixture with the supply air.

2. An air outlet device designed to be mounted within an opening in an enclosure and provided with a supply duct, comprising, an elongated, open-front hollow member provided with end walls, said end walls extending forwardly to seal off the side edges of said opening, said hollow member composed of a unitary wall having in cross section, a transversely extending medial portion, an upper portion extending upwardly and forwardly from the rear edge of said medial portion, and a lower portion extending downwardly from the front edge of said medial portion, said upper and lower portions provided at their outer ends with means for sealing off the top and bottom edges respectively of said opening, said medial portion having therein, in spaced apart relationship to each other along its length, a plurality of spaced openings for flow of supply air upwardly therethrough into the upper portion of said member, and an elongated plate mounted in front of and spaced from said wall to provide between the same and the upper and the lower portions of said wall upper and lower passageways, respectively, said passageways opening at their top and bottom, respectively, through the front of the device and said lower passageway communicating with said upper passageway, whereby supply air flowing through said upper passageway into an enclosure in front of the device induces into said upper passageway through the lower passageway air from the enclosure for admixture with the supply air.

3. An air outlet device as set forth in claim 2 in which the lower portion of the wall of the member extends downwardly and forwardly from the front edge of the medial portion of said wall.

4. An air outlet device as set forth in claim 1 in which supports are mounted on and extend forwardly from the upper portion of the wall of the member and in which the plate is mounted on said supports.

5. An air outlet device as set forth in claim 1 in which supports are mounted on and extend forwardly from the upper portion of the wall of the member, in which screws extend through the plate into said supports to fasten the plate in front of the member, and in which a finishing strip is mounted against the front of the plate in covering relationship to said screws.

6. An air outlet as set forth in claim 2 in which the plate extends from top to bottom of the member and is fastened at its top and bottom to said member and has therein upper and lower sets of openings providing an outlet for the upper passageway and an inlet for the lower passageway, respectively.

7. An air outlet device as set forth in claim 1 in which the upper portion of the wall of the member is curved upwardly and forwardly.

8. An air outlet device as set forth in claim 2 in which the upper portion of the wall of the member is curved upwardly and forwardly.

9. An air outlet device as set forth in claim 1 in which the upper passageway is of Venturi shape in cross section.

10. An air outlet device as set forth in claim 2 in which the upper passageway is of Venturi shape in cross section.

References Cited in the file of this patent

UNITED STATES PATENTS

| | | |
|---|---|---|
| 2,734,445 | Whitney | Feb. 14, 1956 |
| 2,745,332 | Cotts | May 15, 1956 |

FOREIGN PATENTS

| | | |
|---|---|---|
| 456,461 | Great Britain | Nov. 10, 1936 |